Sept. 1, 1970  J. A. POPE  3,526,891
TEMPERATURE RESPONSIVE DEVICES FOR MOVING PARTS OF MECHANISM
Filed Dec. 2, 1968  4 Sheets-Sheet 1

Joseph Albert Pope  INVENTOR:

BY Bierman & Bierman, ATTORNEYS.

{ # United States Patent Office

3,526,891
Patented Sept. 1, 1970

3,526,891
TEMPERATURE RESPONSIVE DEVICES FOR MOVING PARTS OF MECHANISM
Joseph Albert Pope, Bramhall, England, assignor to Mirrlees National Limited, a corporation of Great Britain, Northern Ireland, and Isle of Man
Filed Dec. 2, 1968, Ser. No. 780,447
Claims priority, application Great Britain, Dec. 1, 1967, 54,693/67
Int. Cl. G08b *21/00*
U.S. Cl. 340—227.1                    1 Claim

ABSTRACT OF THE DISCLOSURE

Apparatus for sensing changes in a moving member comprising a moveable element associated with the member in such a manner as to trace a defined normal path of movement therewith, the element being responsive to temperature changes in the moving member so that upon the occurrence of such changs a significant positional change in the normal path of movement is effected and sensor means located adjacent to the path of movement for sensing the change in the path.

---

This invention relates to temperature responsive devices for moving parts of mechanism and has for its object to provide a device whereby change of temperature in one moving part as distinct from another or other adjacent stationary or moving part or parts, may be used to actuate some mechanism, including a simple indicator, by reason of a temperature change.

The invention is particularly, but not exclusively, applicable to an oscillation damper such as is provided for the crankshaft of large internal combustion engines to damp out torsional oscillations therein. Such torsional oscillations, without the provision of an energy-absorbing damper, under certain conditions of frequency of applied impulses can build up to destructive proportions due to resonant or quasi-resonant conditions while with the provision of such a damper the energy absorbed by the damper, under such conditions if unduly maintained, and converted thereby into heat, can give rise to overheating of the damper to an extent detrimental to, if not destructive of, its effectiveness as a damper, and such overheating, therefore, can be destructive, directly or indirectly.

The present problem is to be able to sense the temperature change, and particularly any excessive temperature, of moving part such as a fluid type energy-absorbing damper, as distinct from other adjacent parts, so that danger from overheating of the damper may be indicated and/or used automatically to terminate the cause thereof. While such use relates to a rotary part, the invention is not limited thereto but is applicable to parts of mechanism having linear or other than rotary movement.

According to the present invention apparatus for sensing temperature changes in a moving member comprises means including a movable element associated with said moving member in such manner as to trace a defined normal path of movement therewith, said means being responsive to temperature changes in said moving member so as to cause in response to said changes a significant positional change in said normal path of movement and means adjacent to said path of movement for sensing said change in the said path.

The apparatus aforesaid may be characterised in that the means for sensing change in the path of movement comprises electronic proximity-sensing device.

Figure 1:
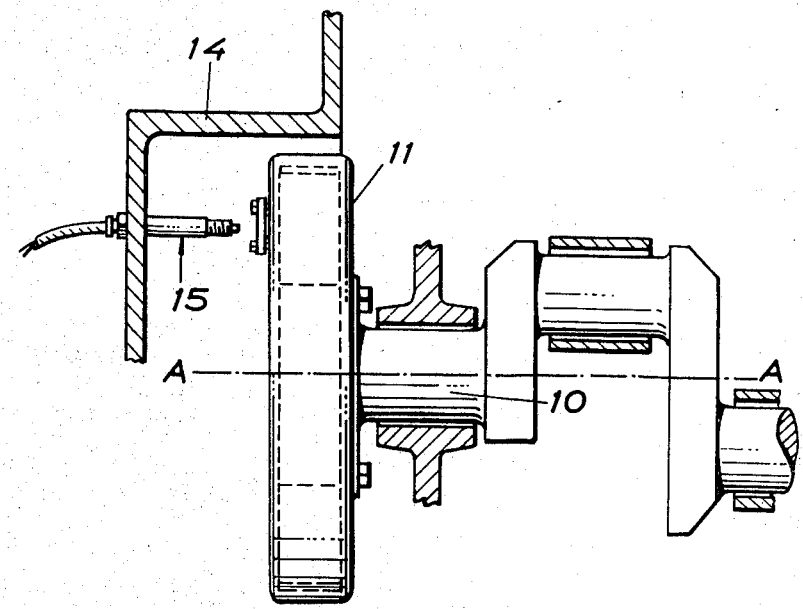
FIG. 1 is a diagrammatic section showing one end of an engine crankshaft and one example of the invention applied thereto.
Figure 2:
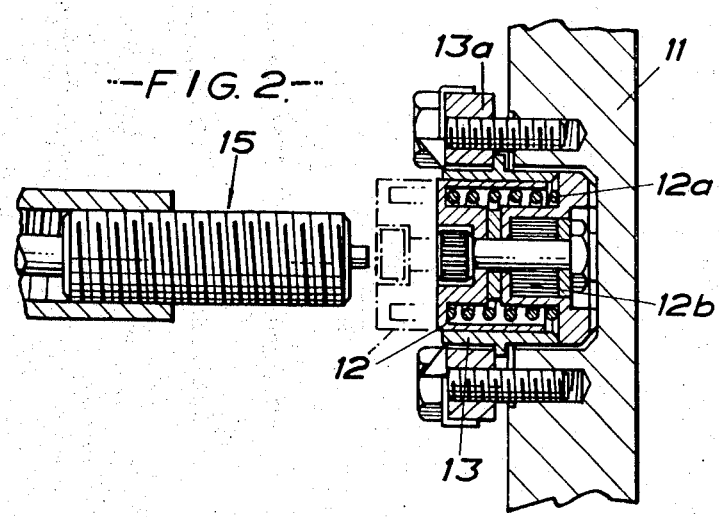
FIG. 2 is a detail section of a part of the mechanism for use in the damper shown in FIG. 1.

As shown in FIGS. 1 and 2 of the drawings, on the end of an engine crankshaft 10 is fitted a fluid type torsion oscillation damper 11 on which is mounted a ferrous metal plunger 12 constituting a movable element, loaded with a spring 12*a* against a fusible plug 12*b* all mounted in a bush 13 attached by a clamping flange 13*a*. The outer end of the plunger 12 therefore traces a circular path about the axis A—A of rotation of the end of the crankshaft 10.

Mounted in the crankcase 14 is an electronic transducer 15 so positioned that the outer end of the ferrous plug passes in its normal path of movement within ½ an inch of the sensing end of the transducer, which latter of course has its usual associated electronic equipment, not shown, capable of reacting to impulses produced by rapid passage of a metallic object within a predetermined distance, so as to operate an alarm and/or stop mechanism for the engine, but not reactive to the passage of the ferrous plug when travelling in its normal path.

The composition of the fusible plug is chosen from known materials so that predetermined overheat conditions of the viscous medium within the damper, with which such fusible plug is in conductive proximity, will fuse, whereupon the spring 12*a* moves the plunger 12 outwardly from the damper so that its outer end traces a significantly changed circular path to pass nearer to the sensing end of the transducer, which then receives impulses of sufficient magnitude to react thereto and activate alarm mechanism and/or stop mechanism or speed-change mechanism for the engine.

The apparatus can be tested by passing a ferrous object rapidly past and in suitable proximity to the pole piece at the sensitive end of the transducer to simulate the passage of the end of the plunger when moving in its changed path after fusion of the plug. After fusion the apparatus can be re-set by renewing the fusible plug.

Although axial movement of the plunger is described above radial movement could also be used. In this case fusion of the plug would allow the plunger to move radially toward the transducer.

Figure 3:
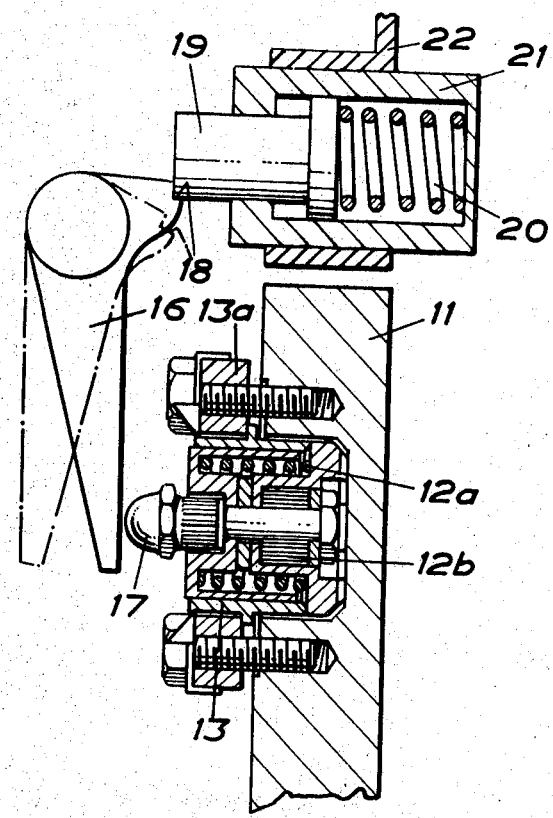
FIGS. 3 to 7 are views similar to FIG. 2 of various modifications.

Referring now to FIG. 3 which illustrates a modification there is provided a fusible plug and plunger arrangement of the kind shown in FIG. 2 and hence the same reference numerals are used as in FIG. 2 for these parts.

In this construction however the transducer is replaced by a mechanically operable trip device comprising a pivotally mounted double armed lever 16, one arm of which lies in the path of movement of a striker formation 17 formed on the end of the plunger. The other arm of the lever 16 is provided with a cut back 18 which, in normal running conditions of the engine, restrains an engine cut-out operating plunger 19 against the force of a spring 20. The plunger 19 and spring 20 are mounted in a housing 21 secured to a part of the engine crankcase 22; the plunger 19 being connected to the engine cut-out arrangement.

When there is an overheat condition the fusible plug will fuse to allow the plunger to contact the arm of lever 16 and move it to the chain line position thus allowing the cut-out plunger 19 to move to operate the engine cut-out.

Whilst it is necessary to replace the fusible plug it is possible to re-set the lever 16 and cut-out plunger 19 after fusion of the plug.

Figure 4:
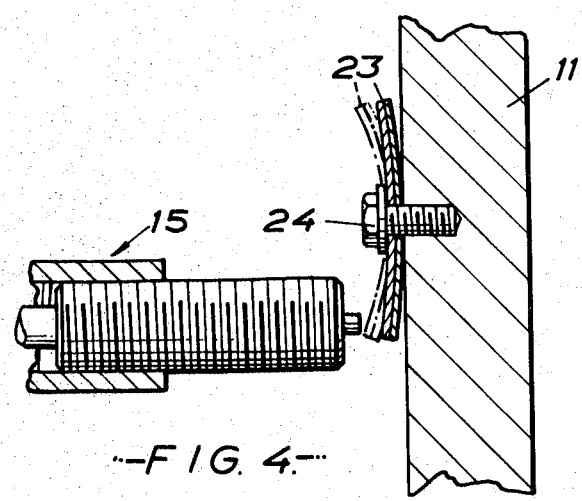

In the arrangement of FIG. 4 a bi-metal disc is used to actuate a transducer 15. In this construction the disc 23 is secured to the torsion oscillation damper 11 by means of a centrally located bolt 24. In normal running conditions the transducer is positioned sufficiently distant from the periphery of the disc 23 to be unaffected. When overheat conditions occur the disc 23 deforms and the periphery thereof moves into closer proximity with the transducer 15 to cause it to react to operate the alarm and/or stop mechanism. The deformed shape of the disc is shown in broken lines. In this construction no replacement of parts is necessary after operation due to overheat since when condition returns to normal the bi-metal disc 23 will return to its normal shape.

Figure 5:
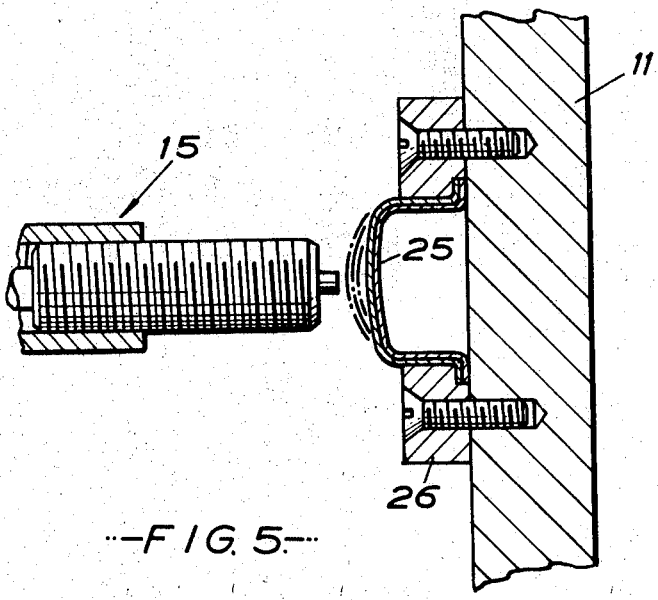

FIG. 5 shows a modification of the arrangement of FIG. 4 in which a plunged bi-metal dished member 25 is clamped peripherally onto the damper 11 by means of a clamping disc 26 which retains the walls of the dished member against deformation. The domed portion thereof (shown in broken line) in which the transducer is effected can however deform from a normal position to one to actuate the stop and/or alarm system.

Figure 6:
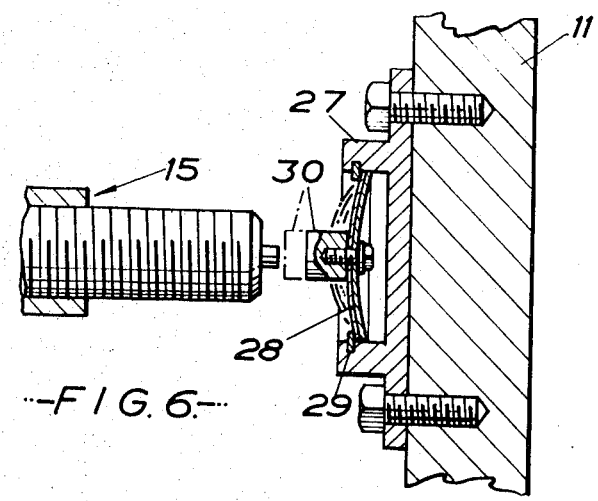
Figure 7:
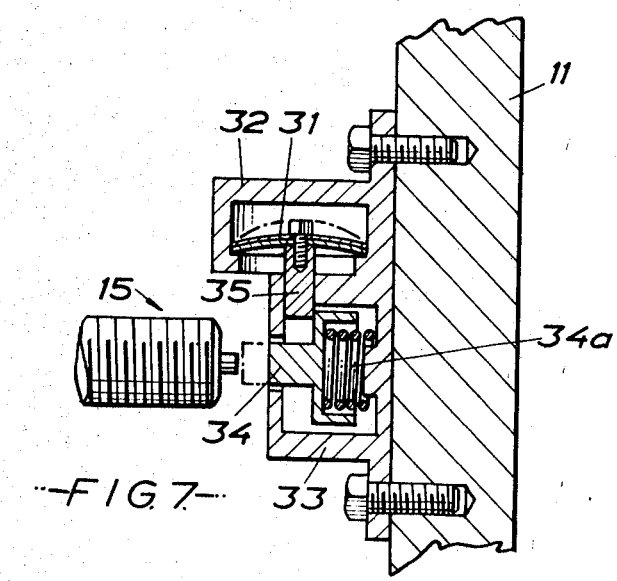

FIGS. 6 and 7 show further modifications using bi-metal elements as the actuation devices for a transducer 15.

In FIG. 6 there is provided a carrier member 27 mounted on the damper 11. Within the carrier is a bi-metal disc 28 retained by an annular spring clip 29 which is located in position in an annular groove in carrier 27. Centrally of the disc 28 is a cap 30 which, upon deformation of the disc 28 moves toward the transducer 15 to cause it to operate in the manner referred to above.

FIG. 7 shows an arrangement which includes a carrier for a bi-metal disc 31, such carrier being a housing 32 for the disc 31 which enables the latter to deform away from a housing 33 for a plunger 34 loaded by a spring 34a. Attached to the disc 31 is a stop arm 35 which in normal conditions restrains the plunger 34 against the force of the spring 34a. When overheat conditions apply the stop arm 35 moves out of contact with the plunger 34 to allow it to move into operative association with the transducer 15.

The arrangement of all of the embodiments of FIGS. 4, 5 and 6 including the bi-metal elements are of course automatically re-setting when the overheat condition no longer applies. The arrangement of FIG. 7 however requires the return of the plunger 34 movably into the housing 33 so that the stop arm can be re-positioned.

The invention is obviously not limited to the examples above described. For instance it can be applied to reciprocating or oscillating mechanism as distinct from rotary mechanism but where damper means have to be employed to damp-out unwanted super-imposed vibration or oscillation and where heat is generated thereby. It can also be applied to the normal rotation or other movement of some part of mechanism where overheating can occur and where a warning of, or automatic reaction from, such overheating is desired before reaching destructive proportions.

What is claimed is:

1. Apparatus for sensing changes in a moving member comprising temperature responsive means associated with said moving member in such manner as to trace a defined normal path of movement therewith, said means being responsive to temperature changes in said moving member so as to cause in response to said changes a significant positional change in said normal path of movement, means adjacent to said path of movement for sensing said change in the said path, said temperature responsive means includes a bi-metal element of disc form carried in a housing and having a stop arm fixedly attached to said disc and in sliding engagement with said housing, said stop arm being adapted when the disc is undeformed to retain a plunger against the force of a spring, the plane of the periphery of said disc being parallel to the force of said spring, said stop arm being translationally moved in a direction perpendicular to said force when said disc is deformed due to temperature change thereby to allow the plunger to move under the influence of said spring such that it follows a path of movement different to said normal path of movement which it traces when retained by said stop arm and by following said different path of movement said plunger actuates an electronic proximity device.

References Cited

UNITED STATES PATENTS

| 117,682 | 8/1871 | Richards | 116—101 |
|---|---|---|---|
| 2,003,018 | 5/1935 | Spencer | 73—378.3 |
| 2,418,579 | 4/1947 | Cranwell | 116—101 |
| 2,716,683 | 8/1955 | Kathe | 73—363.3 |
| 3,096,418 | 7/1963 | Odenwald | 73—378.3 |
| 3,350,660 | 10/1967 | Engdahl | 340—258 |

LOUIS R. PRINCE, Primary Examiner

D. E. CORR, Assistant Examiner

U.S. Cl. X.R.

116—101